(12) United States Patent
Yakacki et al.

(10) Patent No.: US 9,884,941 B2
(45) Date of Patent: Feb. 6, 2018

(54) SYSTEMS AND METHODS OF CREATING LIQUID CRYSTAL POLYMERS USING STEPPED REACTIONS

(71) Applicant: Regents of the University of Colorado

(72) Inventors: Christopher M. Yakacki, Denver, CO (US); Mohand Saed, Denver, CO (US); Devatha P. Nair, Longmont, CO (US); Tao Gong, Superior, CO (US); Christopher Bowman, Boulder, CO (US)

( * ) Notice: Subject to any disclaimer, the term of this patent is extended or adjusted under 35 U.S.C. 154(b) by 312 days.

(21) Appl. No.: 14/754,685

(22) Filed: Jun. 29, 2015

(65) Prior Publication Data

US 2016/0009863 A1    Jan. 14, 2016

Related U.S. Application Data

(60) Provisional application No. 62/018,474, filed on Jun. 27, 2014.

(51) Int. Cl.
| | | |
|---|---|---|
| C08G 75/14 | (2006.01) | |
| B29C 61/00 | (2006.01) | |
| B29K 105/00 | (2006.01) | |

(52) U.S. Cl.
CPC ............ C08G 75/14 (2013.01); B29C 61/003 (2013.01); B29K 2105/0002 (2013.01); B29K 2105/0079 (2013.01)

(58) Field of Classification Search
CPC .......... B29C 61/003; B29K 2105/0002; B29K 2105/0079; C08G 75/14
See application file for complete search history.

(56) References Cited

U.S. PATENT DOCUMENTS

| | | | | |
|---|---|---|---|---|
| 6,312,770 B1 * | 11/2001 | Sage | ...................... | C09K 19/38 |
| | | | | 252/299.01 |
| 2009/0233043 A1 * | 9/2009 | Harris | ................ | C09K 19/2007 |
| | | | | 428/105 |

OTHER PUBLICATIONS

Tailorable and programmable liquid-crystalline elastomers using a two-stage thiol-acrylate reaction; C. M. Yakacki,*a M. Saed,a D. P. Nair,b T. Gong,b S. M. Reedc and C. N. Bowmanb; RSC Adv., 2015, 5, 18997.*

(Continued)

Primary Examiner — Joseph S Del Sole
Assistant Examiner — John Robitaille
(74) Attorney, Agent, or Firm — Furman IP Law (57) ABSTRACT

Provided herein are systems and methods for polymerizing and programming a liquid crystal polymer, including a liquid crystal elastomer (LCE) with two-way shape-memory via a stepped or self-limiting reaction. In the described method, the reaction may be stepped to achieve different aspects of the two-way shape-memory effect in the produced LCE. In one embodiment, the method creates a polydomain LCE body with a completed thiol-acrylate Michael addition reaction polymerization. The method may further crosslink the polydomain LCE body under a stimulus, thereby locking a domain state in a portion of the polymer. A two-way shape-memory effect of the LCE may thereafter be programmed and locked into the LCE the second stage polymerization reaction. The self-limiting reaction allows for unprecedented control over LCE domain states and crosslinking densities, as well as the resultant mechanical and optical properties of the LCE formed.

20 Claims, 8 Drawing Sheets

(56) References Cited

OTHER PUBLICATIONS

Metallo-, Thermo-, and Photoresponsive Shape Memory and Actuating Liquid Crystalline Elastomers; Brian T. Michal, Blayne M. McKenzie, Simcha E. Felder, and Stuart J. Rowan; Macromolecules 2015, 48, 3239-3246.*
Programmable Liquid Crystal Elastomers Prepared by Thiol-Ene Photopolymerization; Taylor H. Ware, Zachary P. Perry, Claire M. Middleton, Scott T. Iacono, and Timothy J. White; ACS Macro Lett. 2015, 4, 942-946.*
Improved synthesis of functionalized mesogenic 2,6-bisbenzimidazolylpyridine ligands; Blayne M. McKenzie, Adriane K. Miller, Rudy J. Wojtecki, J. Casey Johnson, Kelly A. Burke, Karis A. Tzeng, Patrick T. Mather, Stuart J. Rowan; Tetrahedron 64 (2008) 8488-8495.*
Kinetics of Thiol-Ene and Thiol-Acrylate Photopolymerizations with Real-Time Fourier Transform Infrared; Neil B. Cramer, Christopher N. Bowman; Journal of Polymer Science: Part A: Polymer Chemistry, vol. 39, 3311-3319 (2001).*

* cited by examiner

| Name | Weight (g) | MW (g/mol) | Functionality (f) | Purity (%) | Mol-Func (mmol-f) |
|---|---|---|---|---|---|
| RM257 | 1.000 | 588.6 | 2 | 97.3 | 3.306 |
| EDDET | 0.240 | 182.3 | 2 | 95 | 2.501 |
| PETMP | 0.048 | 488.7 | 4 | 95 | 0.374 |
| Toluene | 0.313 | 92.1 | -- | -- | -- |
| HHMP | 0.006 | 224.3 | -- | -- | -- |
| DPA* | 0.313 | 101.2 | 1 | -- | 0.031 |

*Diluted 1:100 in toluene

Fig. 11

SYSTEMS AND METHODS OF CREATING LIQUID CRYSTAL POLYMERS USING STEPPED REACTIONS

PRIORITY APPLICATIONS

This non-provisional application claims priority to U.S. Provisional Application No. 62/018,474 filed Jun. 27, 2014 and entitled "SYSTEMS AND METHODS OF CREATING LIQUID CRYSTAL POLYMERS USING STEPPED REACTIONS," the entire contents of which are incorporated by reference herein for all purposes.

GOVERNMENT SPONSORSHIP

The disclosure herein was developed with support from the National Science Foundation CAREER Award #CMMI-1350436.

FIELD OF THE TECHNOLOGY

Embodiments of this disclosure relate to creating liquid crystal polymers with novel processes leading to improved operational properties of the resulting liquid crystal polymers.

SUMMARY OF THE DESCRIPTION

Provided herein are systems and methods for polymerizing and programming a liquid crystal polymer, including a liquid crystal elastomer (LCE) with two-way shape-memory via a stepped or self-limiting reaction. In the described method, the reaction may be stepped to achieve different aspects of the two-way shape-memory effect in the produced LCE. In one embodiment, the method creates a polydomain LCE body with a completed thiol-acrylate Michael addition reaction polymerization. The method may further crosslink the polydomain LCE body under a stimulus, thereby locking a domain state in a portion of the polymer. A two-way shape-memory effect of the LCE may thereafter be programmed and locked into the LCE the second stage polymerization reaction. The self-limiting reaction allows for unprecedented control over LCE domain states and crosslinking densities, as well as the resultant mechanical and optical properties of the LCE formed.

In one aspect, the disclosure describes an exemplary process including creating a monomeric solution with a non-stoichiometric ratio of acrylate functional groups to thiol functional groups in the monomeric solution, the non-stoichiometric ratio being greater than 1. The method continues with causing a first polymerization of the monomeric solution that is limited by the non-stoichiometric ratio, resulting in a LCE body with a surplus of unreacted acrylate functional groups. The method further includes deforming with a first bias force the LCE body along at least one dimension of the LCE body into a first shape, wherein the first shape aligns a plurality of polydomains in the LCE body into a temporary monodomain.

In another aspect, the disclosure describes an exemplary process creating a monomeric solution with a non-stoichiometric ratio of acrylate functional groups to thiol functional groups in the monomeric solution, the non-stoichiometric ratio being greater than 1. The method includes causing a first polymerization of the monomeric solution at a first temperature that is limited by the non-stoichiometric ratio, resulting in a LCE body with a surplus of unreacted acrylate functional groups. The method further includes providing a stimulus to transition a portion of the LCE body to a different molecular domain configuration selected from the group consisting of: isotropic, polydomain, and monodomain.

In one embodiment, the disclosure describes that the portion of the LCE body is a first portion of the LCE body, and the method further includes causing a second polymerization of a portion of surplus unreacted acrylate functional groups in a second portion of the LCE body and thereby producing in the second portion of the LCE body a permanent domain configuration selected from the group consisting of: isotropic, polydomain, and monodomain.

Other embodiments and features of the present disclosure will be apparent from the accompanying drawings and from the detailed description which follows.

DESCRIPTION OF THE DRAWINGS

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one. Reference in this specification to "one embodiment" or "an embodiment" or the like means that a particular feature, structure, or characteristic described in connection with the embodiment is included in at least one embodiment of the disclosure. The appearances of the phrase "in one embodiment" or the like in various places in the specification are not necessarily all referring to the same embodiment, nor are separate or alternative embodiments mutually exclusive of other embodiments. Moreover, various features are described that may be exhibited by some embodiments and not by others.

Figure 1:
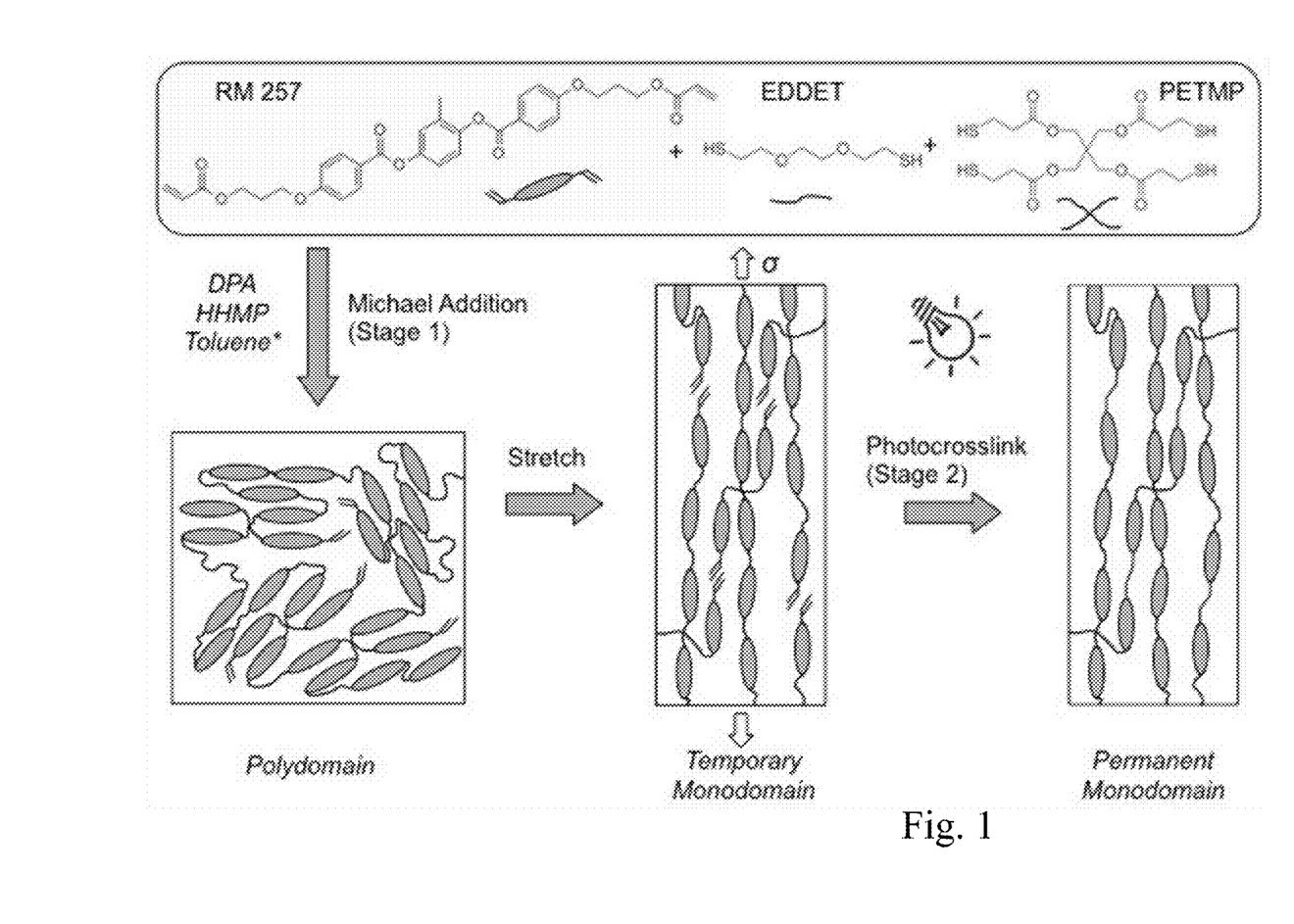
FIG. 1 illustrates various domain transitions of an exemplary LCE transitioning based on temperature of the LCE and based on electromagnetic radiation on the LCE.
Figure 6:
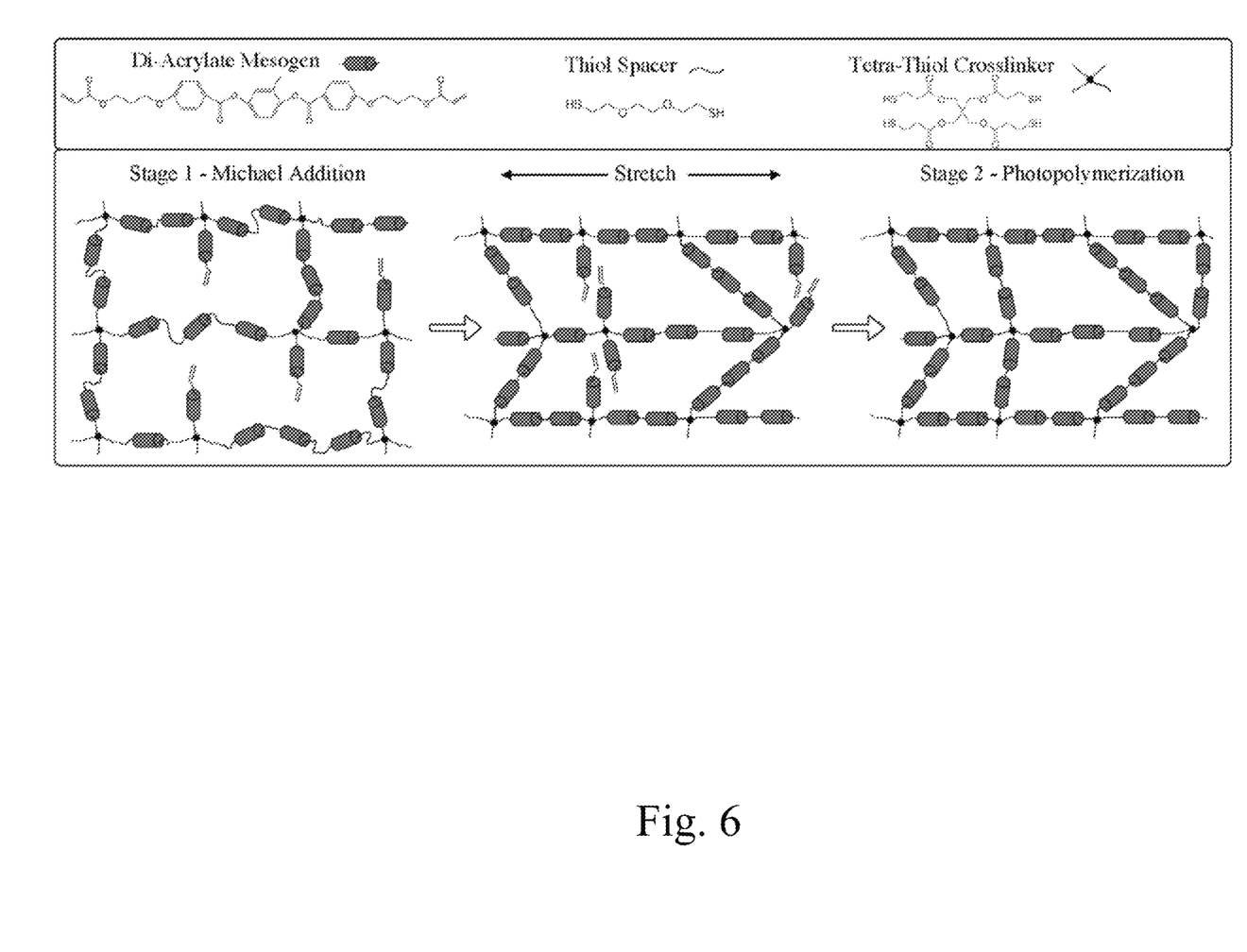
FIG. 6 illustrates additional details of various domain transitions of an exemplary LCE transitioning based on temperature of the LCE and based on electromagnetic radiation on the LCE.

FIG. 1 and FIG. 6 illustrate various domain transitions of an exemplary LCE transitioning based on temperature of the LCE and based on electromagnetic radiation on the LCE. Synthesis of the LCE body during an initial thiol-acrylate Michael Addition reaction as described further herein can be used to initially synthesize the LCE body into any domain state of the LCE, including isotropic, polydomain, and monodomain states. For example, temperature may be controlled in order to synthesize the LCE body into the isotropic state during a first Thiol-Acrylate Michael Addition reaction. Thereafter, as described further herein, during a second stage reaction, the LCE body may be further crosslinked to partially or completely crosslink the remaining acrylate groups to fix another domain state (e.g., in only certain portions of the LCE body) that is different than isotropic.

As shown in the FIG. 1 and FIG. 6 domain states may be transitioned or influenced in an LCE body via applying a stimulus to the body (or a portion of the body), for example, via heating/cooling, straining/releasing, etc.

Synthesis of an LCE body into various domain states may be performed using any technique known for synthesizing LCEs while controlling the domain state. Various techniques for aligning mesogens (or allowing for their isotropic non-alignment) during the initial LCE synthesis exist. For example, techniques exist to create a monodomain during synthesis, including applying a magnetic field, brushing mechanical brushing, alignment layers, etc. The monomeric solution may also be heated, cooled or exposed to other environmental factors to influence synthesis of the LCE body into a particular domain state.

LCE bodies may be made to exhibit two-way shape-memory behavior both through an initial synthesis of a first shape, and either thereafter applying a bias force or, alternatively, thereafter continuing to crosslink unreacted acrylate groups while the LCE body is induced into another domain configuration. The LCE body may then exhibit two-way shape-memory properties such as shape change over temperature or development of force over temperature.

Figure 5:
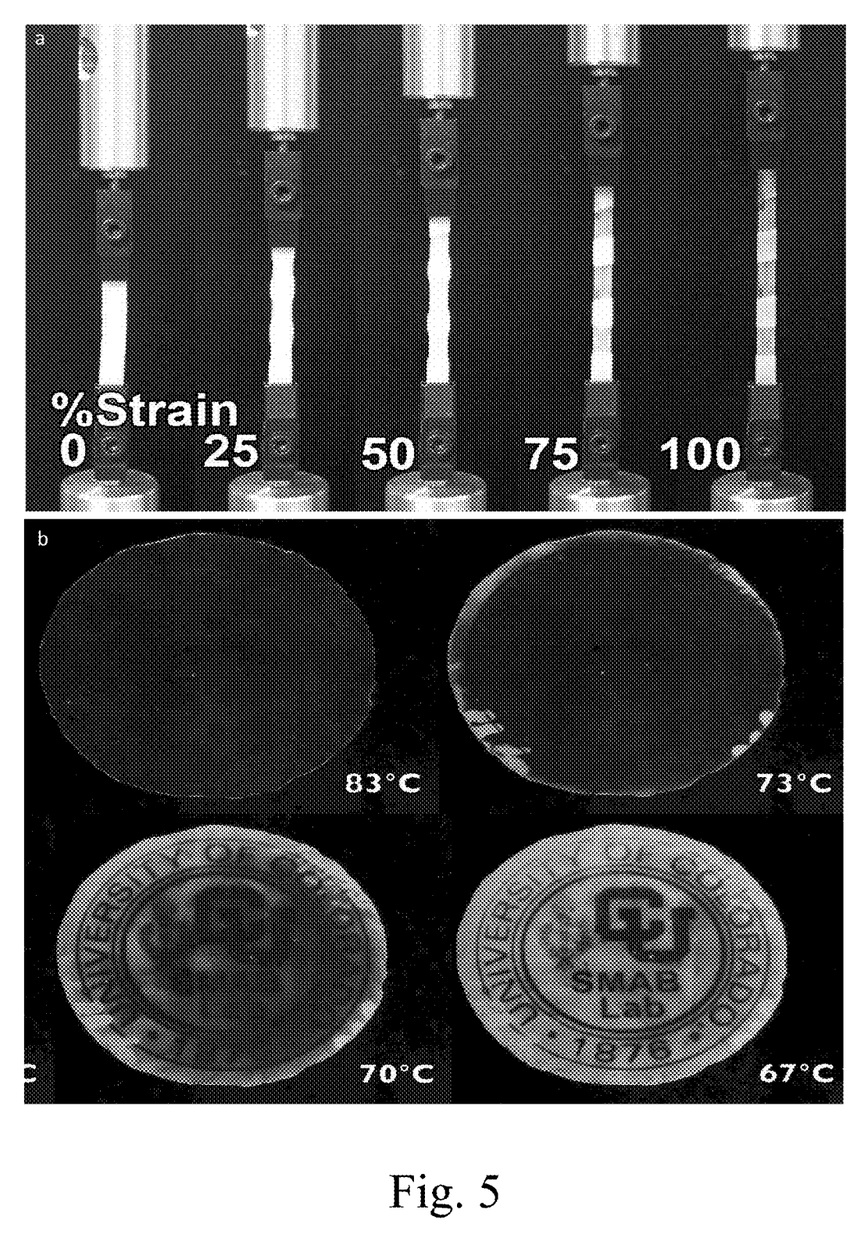
FIG. 5 illustrates spatial control over creation of monodomain regions during the second stage reaction of a TAMAP reaction.

The LCE body may also continue to exhibit optical and mechanical properties that interact with the two-way shape-memory properties. As shown in FIG. 5, certain portions of the LCE body under strain resist realignment into a monodomain, and thus remain (largely) in a polydomain state that appears more opaque, whereas the portions with only primary crosslinking are realigned into monodomains and thus appear more transparent when stretched. Also as described further herein, certain portions of an LCE body have been synthesized to fix a polydomain state which resists transition into a monodomain state under strain, whereas other portions of the LCE body may be stretched back into a monodomain state. This is shown as differences in opacity of the stretched samples under differing levels of strain. Two-way shape-memory may thus be exhibited via combinations of fixing the LCE body (or a portion) in particular state and then transitioning (or attempting to transition) that domain state to another domain state via a stimulus.

FIG. 6 illustrates the formation of a polydomain state, a temporary monodomain state and fixing a monodomain of a liquid crystal elastomer (LCE) via a two-staged thiol-acrylate Michael addition-photopolymerization (TAMAP) reaction. A thiol-acrylate Michael addition is a click reaction between a thiol group and electron deficient vinyl group, such as an acrylate. Previous work by Hoyle has shown that near 100% conversion of the thiol groups can be attained and controlled over a timescale of approximately 1 minute to 1 day. The mesogen RM 257 was selected for its use as a popular diacrylate mesogen, while a di-functional and a tetra-functional thiol monomer were selected for use as a flexible spacer and crosslinker, respectively. Non-equimolar solutions were simply mixed in a vial, poured into molds, and allowed to cure in open air. These non-equimolar solutions were included to create a non-stoichiometric ratio of thiol and acrylate groups in the solution.

Other ways of creating a non-stoichiometric ratio of thiol and acrylate groups may be used with these described methods, including, for example, a solution including a single complex mesogen that includes both thiol and acrylate functional groups. The non-stoichiometric ratio including an unequal number of thiol and acrylate groups in the solution is relied upon in the TAMAP reaction in order to stop the first stage of the reaction while leaving unreacted acrylate groups. The reactions described herein were tested with non-stoichiometric acrylate-to-thiol group ratios greater than 1:1 and less than 2:1. Particularly, solutions with a non-stoichiometric ratio of 1.15:1 were used for many of the examples studied herein.

Figure 11:
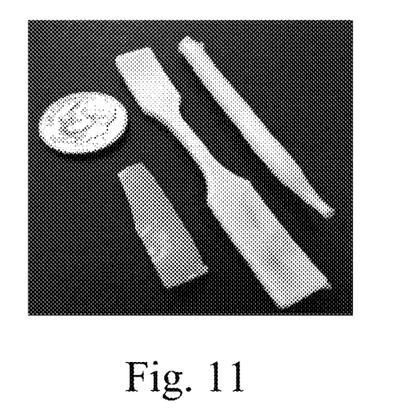
FIG. 11 illustrates various testing samples showing the Michael addition reaction may be used to create a polydomain LCE that is not limited to a size or scale.

Also as described further herein, alternative formulations of the monomeric solutions may include photoinitiators (e.g., for a second stage reaction), The first stage reaction is used to create a polydomain LCE with via Michael addition reaction, which is not limited to size or scale (FIG. 11). This first reaction will self-terminate when the thiol groups have nearly all reacted. A second stage photopolymerization reaction can occur between excess acrylate groups present in the system. This reaction can be used to further tailor the properties (i.e. crosslinking density) of the polydomain or permanently program an aligned monodomain sample.

Figure 2:
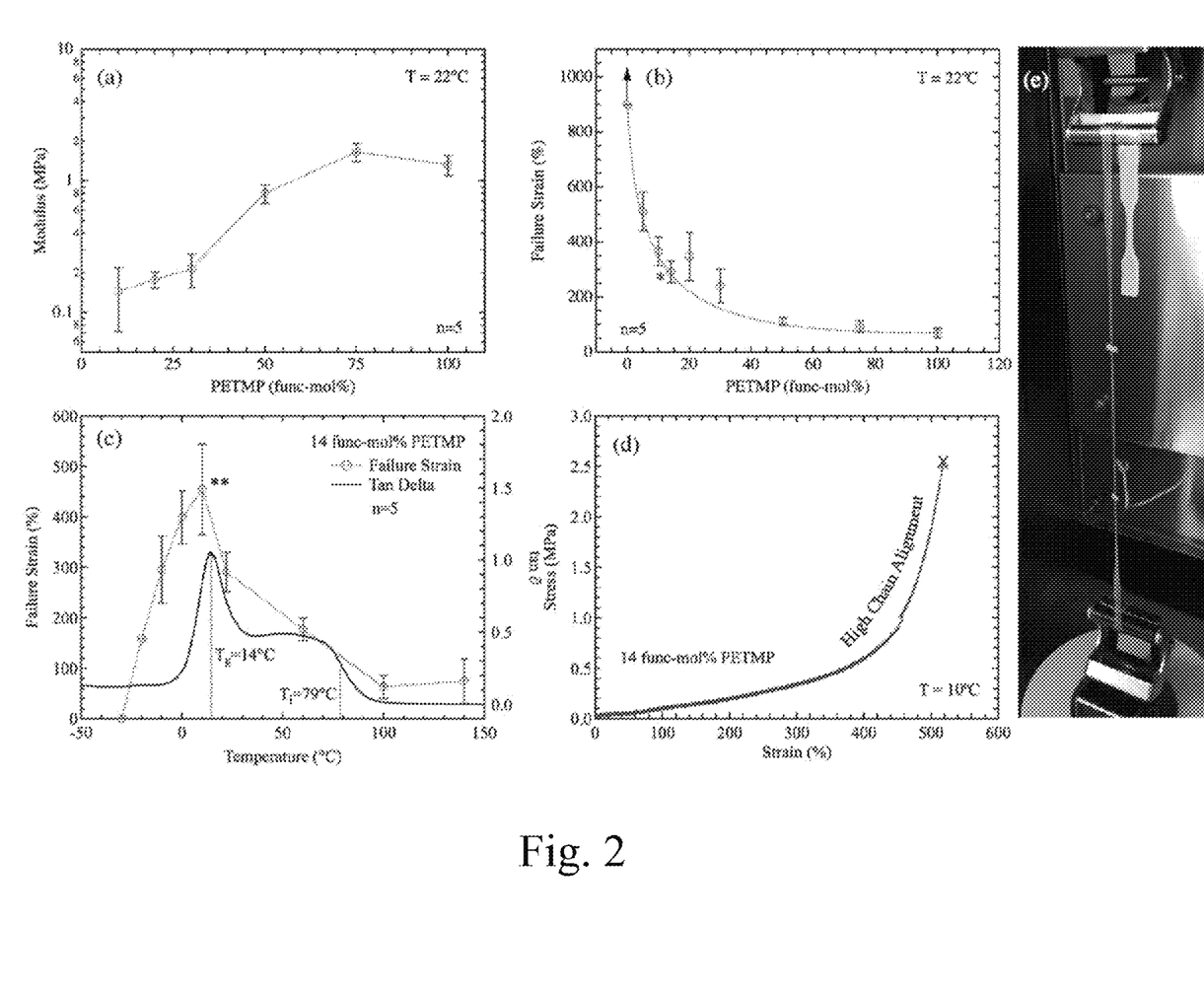
FIG. 2 illustrates various mechanical data of various polydomain LCE bodies formed with different crosslinking densities after implementing only the first stage of a TAMAP reaction in which a polydomain LCE was synthesized.

FIG. 2 illustrates various mechanical data of various polydomain LCE bodies formed with different crosslinking densities after implementing only the first stage of a TAMAP reaction in which a polydomain LCE was synthesized. Polydomain LCEs have garnered interest from the scientific community for their ability to demonstrate both "soft elasticity" when stretched as well as thermal actuation when under a constant stress. For this data, the thiol-acrylate Michael addition reaction (Stage 1 only) was used to tailor a series of polydomain LCE samples. The initial modulus and strain-to-failure were tailored by varying the amount of thiol groups that belonged to the thiol crosslinker (FIG. 2). Both properties could be tailored by an order of magnitude higher. It should be noted that modulus values were difficult to obtain at low levels of crosslinking. Next, we chose to focus on a composition with 14% molar functionality of PETMP as a representative system with a relatively low crosslinking density and high potential for monodomain alignment at room temperature. When investigating the influence of temperature on strain-to-failure, it was shown that the maximum strain potential was realized around the peak of tan ∂. This is similar to amorphous SMP networks, which have shown a maximum deformability peak influenced by tan ∂, in which fracture is avoided when dissipative mechanisms are increased. It should be noted that the non-traditional tan ∂ function, of LCEs allow a broader range of temperatures with increased strain potential, which decreases significantly above the isotropic temperature. The behavior represented by the temporarily elevated plateau in the tan ∂ function has been attributed to soft elasticity, in which mesogens can rotate to accommodate stresses in the network. The stress-strain behavior shows a sharp increase in stress at high levels of strain, which indicates a high degree of chain. Visual examination shows the LCE transitioning from the polydomain to the monodomain, which is represented by a change from opaque white to clear transparency.

Figure 3:
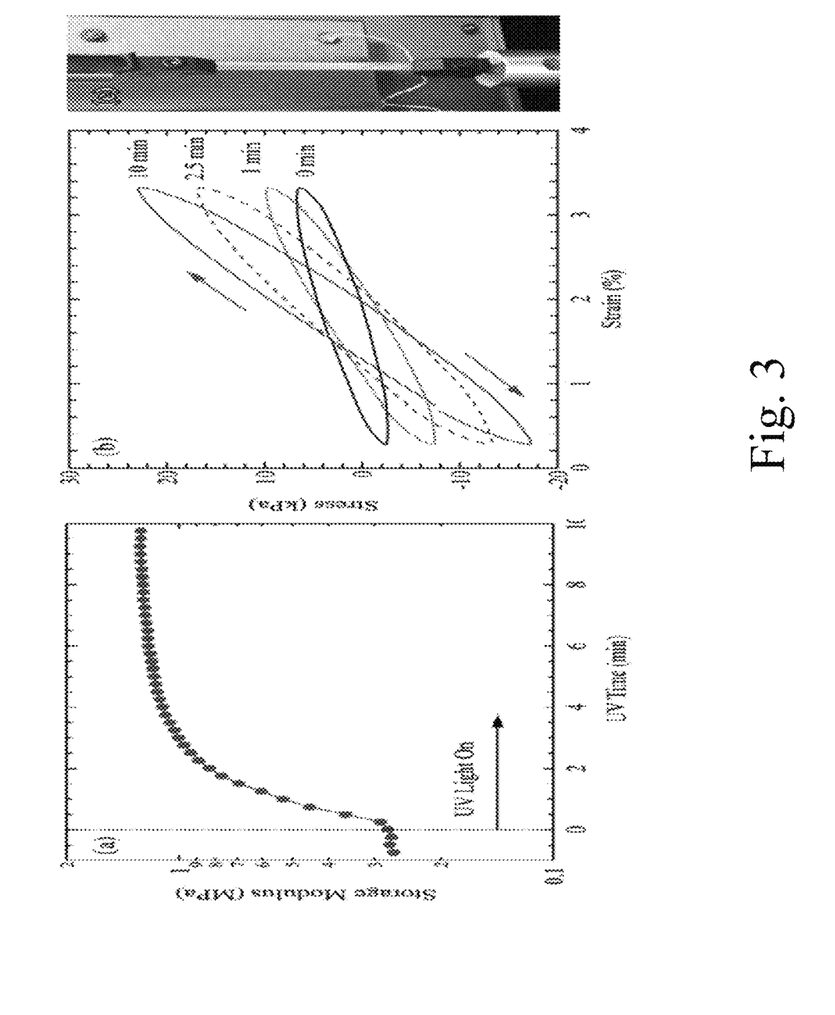
FIG. 3 illustrates storage modulus and cyclical stress-strain behavior of an LCE changing over time during a photo-crosslinking second stage of a TAMAP reaction.
Figure 7:
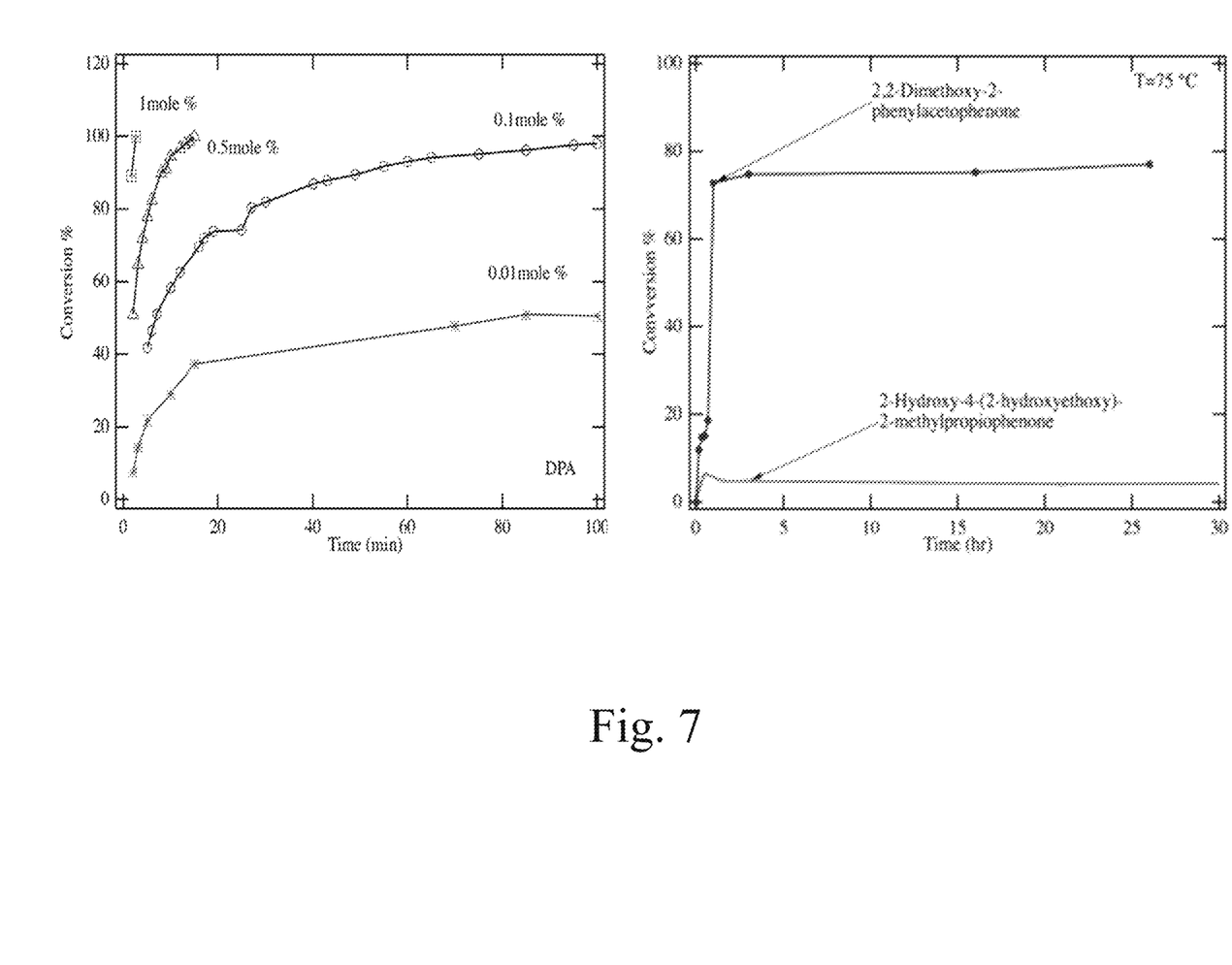
FIG. 7 shows conversion vs. time for a representative thiol-acrylate system using an equimolor ratio of EDDET and bisphenol-a-ethoxylate diacrylate using a DPA catalyst and two different photoinitiators at an elevated temperature.

FIG. 3 illustrates storage modulus and cyclical stress-strain behavior of an LCE changing over time during a photo-crosslinking second stage of a TAMAP reaction. A major advantage to the two-stage TAMAP approach is that the photo-crosslinking reaction (Stage 2) offers spatio-temporal control to tailor and program LCE networks. The crosslinking density, and subsequently modulus, of the initial polydomain network can be increased as a function of UV irradiation time, as the excess acrylate groups will react together and establish new crosslinks. For this system, the results show that the photo-crosslinking reaction results in an increase in modulus by approximately one order of magnitude and is completed within 10 minutes. An investigation into the dynamic loading response is shown in FIG. 3. Though a hysteresis loop is still present in the networks, the damping function (tan ∂) decreases from 0.62 to 0.25 over the course of the photo-crosslinking reaction. Previous results by Nair et al. showed that the increase of modulus in amorphous SMP networks could be increased by up to three orders of magnitude by using a 2:1 ratio of acrylate to thiol functional groups in the initial mixture. This approach can be made compatible with any thermal or UV initiator; however, in this study we chose HHMP for its long-term stability at elevated temperatures above the isotropic temperature and in the presence of visible light (FIG. 7).

The second stage photo-polymerization reaction can also be used to program a permanently aligned monodomain in stretched LCE samples. The efficiency of the second stage reaction is measured as fixity as a function of increasing stretch:

Fixity (%)=ϵ_fixed/ϵ_applied×100

Wherein ϵ_applied is the amount the sample is stretched before photo-crosslinking and ϵ_fixed is the amount of permanent strain after photo-crosslinking.

Figure 4:
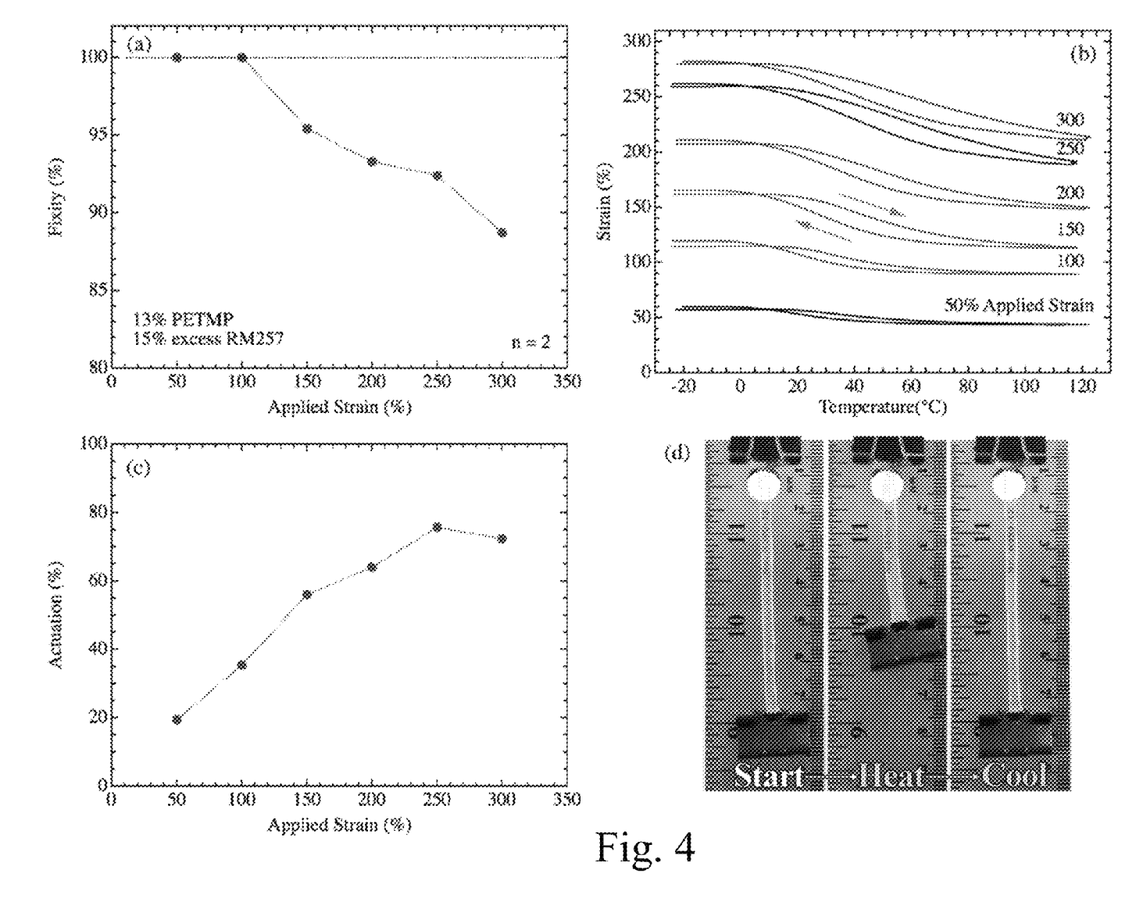
FIG. 4 illustrates the shape fixity and shape change of an LCE after the second stage of a TAMAP reaction that creates a fixed monodomain state in the LCE body after the second stage reaction.

The second stage reaction showed excellent shape fixity in maintaining a stretched configuration, typically above 90% (FIG. 4). For example, the samples stretched to 300% maintained 267% of permanent strain. This approach to programming a permanent monodomain offers a distinct advantage over traditional gel-stretch-crosslink approaches pioneered by Finklemann, as the second stage reaction is truly independent of the first stage reaction and can be delayed indefinitely. This methodology has allowed us to send polydomain samples to collaborators at different institutions to perform the programming of the monodomain, a feat that has not been previously reported. Once programmed, monodomain samples then were tested for actuation as a function of temperature (FIG. 4). For clarity, strain was calculated as a function of the original gauge length of the un-stretched samples. All samples exhibited actuation, with the total magnitude of actuation strain proportional to the degree of applied strain during programming of the monodomain (FIG. 4). This is in agreement with previous studies that have shown actuation strains increase when samples are subjected to higher alignment stresses; however, this method allows the degree of monodomain alignment to be tailored and free from external mechanical stress. All samples showed the ability to exhibit repeatable and reversible shape change (FIG. 9) and a demonstration of the actuation can be seen in FIG. 4.

FIG. 4 illustrates the shape fixity and shape change of an LCE after the second stage of a TAMAP reaction that creates a fixed monodomain state in the LCE body after the second stage reaction. Therein illustrated are some of the two-way shape-memory properties of the produced LCEs. As shown in FIG. 4, maximum magnitude of actuation increases with degree of forced chain alignment under a stimulus (e.g., applied strain). As shown in FIG. 4, a bench-top demonstration may be made of reversible actuation as a function of heating and cooling.

Figure 10:
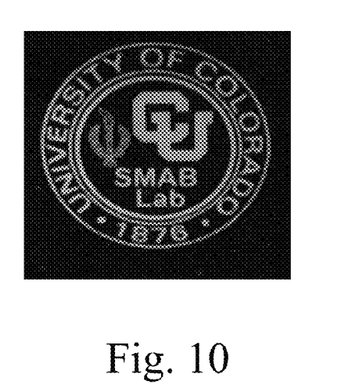
FIG. 10 illustrates the circular photo-mask used in the creation of the circular LCE film illustrated in FIG. 5.

FIG. 5 illustrates spatial control over creation of monodomain regions during the second stage reaction of a TAMAP reaction. Shown are photos of the LCE body at different temperatures after the LCE body was exposed to UV light masked by a photomask to limit the regions in which secondary crosslinking occurred to fix monodomain states in portions of the LCE body and leave other portions of the LCE body in an unreacted polydomain state The second-stage photo-crosslinking reaction may be combined with traditional photo-masking techniques to provide spatial control over tailoring the properties of the LCE materials. To demonstrate this effect, LCE samples were sandwiched between two glass slides with a photo-mask placed on top of the glass. A UV lamp was placed approximately 50 cm from the sample for 10 minutes. For the rectangular sample shown in FIG. 5, the photo-mask consisted of alternating stripes and the reaction was carried out at room temperature. For the circular film sample shown in FIG. 5, a photo-mask of a laboratory logo was placed on a sample and as is also shown in FIG. 10. In this instance, photo-crosslinking was performed above the isotropic transition temperature (Ti) at 90° C., thereby fixing an isotropic state in those regions and inhibit polydomain states from forming after cooling to below the isotropic temperature.

Other domain states may be similarly crosslinked into portions of the LCE body. Indeed, as described further herein, synthesis and secondary crosslinking may be performed (using appropriate stimulus) to create any synthesized domain state in the first stage reaction and any secondarily crosslinked domain state in the second stage reaction.

Localizing the crosslinking of either the first or second stage reaction to inhibit or create formation of a particular domain state during primary/secondary crosslinking using photomask and similar techniques, as well as other ways of creating gradients in or patterning of a stimulus used to transition a portion of an LCE body. Thus, portions of an LCE body may be exposed to different levels of stimulus, allowing for gradients in either or both primary/secondary crosslinking, and therefore gradients in domain state and domain state fixity for portions across an LCE body. For example, as shown with the exemplary photomasked LCE body, light may be used with a photoinitiator in the second reaction (above the isotropic temperature) to pattern regions with an isotropic state that resists returning to a polydomain state upon cooling. As another example, heat may be used to initiate a primary/secondary crosslinking reaction and temperature differentials may be applied across the LCE body to create regions in which that crosslinking reaction occurs. Because the second stage reaction can be delayed indefinitely, to be performed later, partially, or not performed at all, in portions of the LCE body, the described methods of a TAMAP stepped reaction with spatial control allow nearly complete control over the types of domain states and crosslinking over the entire LCE body.

Additional Experimental and Fabrication Details

LCEs are a class of actively moving polymers that are capable of mechanical actuation in response to a stimulus, commonly heat or light. Unfortunately, LCEs have not experienced the same level of widespread research attention as other classes of actively moving polymers, such as shape-memory polymers (SMPs). In comparison, both systems are generally known for their ability to mechanically respond to a change in temperature. Also, both systems require proper programming of the polymer to an aligned state before shape change can occur. The key difference is that SMPs exhibit a one-time shape-recovery event when heated above a thermal transition (Tg or Tm) and are driven by entropy elasticity, while LCEs can repeatedly undergo a shape-switching phenomenon driven by a reversible anisotropic-isotropic transition (Ti) associated with liquid-crystalline order. As a result, LCEs have an added degree of functionality capable of creating devices that repeatedly actuate over the lifetime of the device, such as in an artificial muscle; nevertheless, SMPs have received a higher profile of interest for proposed applications, especially biomedically-related. It is of interest to note that recently researchers have proposed incorporating the shape-memory effect within LCE systems to take advantage of both mechanisms.

There are two main factors that have restricted the growth of LCE research, which involve the difficulty of synthesis and programing of monodomain LCE samples. First, the synthesis of main-chain LCEs have been traditionally been obtained by polyesterification, hydrosilylation, or epoxy-resin reactions, which require high purity starting materials and careful experimental conditions to prevent side reactions or the evaporation of volatile constituents. Recently, a free-radical, thiol-ene "click" chemistry approach has been investigated to create a more efficient reaction mechanism; however, this approach involves using custom-synthesized starting mesogenic monomers, which presents its own set of challenges. Second, programming an LCE with stable monodomain alignment has always been a technical barrier. One-step polymerizations have been performed in the presence of electric fields or by surface alignment, although these techniques are limited to thin film samples. Another approach is to utilize a two-step process that stops a polycondensation reaction once the polymer has gelled, stretches the gel to align the monodomain, and continues the reaction to establish crosslinks to stabilize the monodomain alignment. This method involves stopping the reaction at a critical point during the gelation process and can be difficult to duplicate. Recent studies have proposed unique methods to avoid this process by introducing photo-sensitive crosslinking side groups along the main chain or using exchangeable crosslinks at high temperatures.

We introduce an unexplored approach to enhance both synthesis and programming of LCEs using a two-stage TAMAP reaction. A thiol-acrylate Michael addition is a click reaction between a thiol group and electron deficient vinyl group, such as an acrylate. Previous work by Hoyle has shown that near 100% conversion of the thiol groups can be attained and controlled over a timescale of approximately 1 minute to 1 day. For this study, we chose commercially available starting materials with no additional purification to show the utility of the approach. RM 257 was selected for its use as a popular diacrylate mesogen, while a di-functional and a tetra-functional thiol monomer were selected for use as a flexible spacer and crosslinker, respectively. Non-equimolar solutions were simply mixed in a vial, poured into molds, and allowed to cure in open air. The first stage reaction is used to create a polydomain LCE with via Michael addition reaction, which is not limited to size or scale (FIG. 11). This first reaction will self-terminate when the thiol groups have nearly all reacted. A second stage photopolymerization reaction can occur between excess acrylate groups present in the system. This reaction can be used to further tailor the properties (i.e. crosslinking density) of the polydomain or permanently program an aligned monodomain sample. The remainder of this letter will demonstrate how this approach offers a high degree of control and tailor-ability to the initial polydomain properties, monodomain alignment, and unique liquid-crystalline behavior.

Polydomain LCEs have garnered interest from the scientific community for their ability to demonstrate both "soft elasticity" when stretched as well as thermal actuation when under a constant stress. The thiol-acrylate Michael addition reaction (Stage 1 only) was used to tailor a series of polydomain LCE samples. The initial modulus and strain-to-failure were tailored by varying the amount of thiol groups that belonged to the thiol crosslinker (FIG. 2). Both properties could be tailored by an order of magnitude higher. It should be noted that modulus values were difficult to obtain at low levels of crosslinking. Next, we chose to focus on a composition with 14% molar functionality of PETMP as a representative system with a relatively low crosslinking density and high potential for monodomain alignment at room temperature. When investigating the influence of temperature on strain-to-failure, it was shown that the maximum strain potential was realized around the peak of tan $\partial$ (FIG. 3). This is similar to amorphous SMP networks, which have shown a maximum deformability peak influenced by tan $\partial$, in which fracture is avoided when dissipative mechanisms are increased. It should be noted that the non-traditional tan $\partial$ function, of LCEs allow a broader range of temperatures with increased strain potential, which decreases significantly above Ti. The behavior represented by the temporarily elevated plateau in the tan $\partial$ function has been attributed to soft elasticity, in which mesogens can rotate to accommodate stresses in the network. The stress-strain behavior shows a sharp increase in stress at high levels of strain, which indicates a high degree of chain alignment (FIG. 2). Visual examination shows the LCE transitioning from the polydomain to the monodomain, which is represented by a change from opaque white to clear transparency (FIG. 5).

A major advantage to the two-stage TAMAP approach is that the photo-crosslinking reaction (Stage 2) offers spatio-temporal control to tailor and program LCE networks. The crosslinking density, and subsequently modulus, of the initial polydomain network can be increased as a function of UV irradiation time (FIG. 3), as the excess acrylate groups will react together and establish new crosslinks. For this system, the results show that the photo-crosslinking reaction results in an increase in modulus by approximately one order of magnitude and is completed within 10 minutes. An investigation into the dynamic loading response is shown in FIG. 3. Though a hysteresis loop is still present in the networks, the damping function (tan $\partial$) decreases from 0.62 to 0.25 over the course of the photo-crosslinking reaction. Previous results by Nair et al. showed that the increase of modulus in amorphous SMP networks could be increased by up to three orders of magnitude by using a 2:1 ratio of acrylate to thiol functional groups in the initial mixture. This approach can be made compatible with any thermal or UV initiator; however, in this study we chose HHMP for its long-term stability at elevated temperatures above Ti and in the presence of visible light (FIG. 7).

Figure 9:
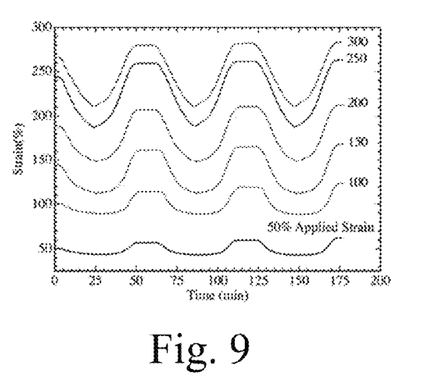
FIG. 9 shows graphs of LCE samples strained to different percentages, and thus creating different levels of monodomain alignment, and shown as cycled through strain over time to demonstrate reversible actuation.

The second stage photo-polymerization reaction can also be used to program a permanently aligned monodomain in stretched LCE samples. The efficiency of the second stage reaction is measured as fixity as a function of increasing stretch:

$$\text{Fixity}(\%) = \frac{\varepsilon_{fixed}}{\varepsilon_{applied}} \times 100$$

where $\varepsilon_{applied}$ is the amount the sample is stretched before photo-crosslinking and $\varepsilon_{fixed}$ is the amount of permanent strain after photo-crosslinking. The second stage reaction showed excellent shape fixity in maintaining a stretched configuration, typically above 90% (FIG. 4). For example, the samples stretched to 300% maintained 267% of permanent strain. This approach to programming a permanent monodomain offers a distinct advantage over traditional gel-stretch-crosslink approaches pioneered by Finklemann, as the second stage reaction is truly independent of the first stage reaction and can be delayed indefinitely. This methodology has allowed us to send polydomain samples to collaborators at different institutions to perform the programming of the monodomain, a feat that has not been previously reported. Once programmed, monodomain samples then were tested for actuation as a function of temperature (FIG. 3). For clarity, strain was calculated as a function of the original gauge length of the un-stretched samples. All samples exhibited actuation, with the total magnitude of actuation strain proportional to the degree of applied strain during programming of the monodomain (FIG. 3). This is in agreement with previous studies that have shown actuation strains increase when samples are subjected to higher alignment stresses; however, this method allows the degree of monodomain alignment to be tailored and free from external mechanical stress. All samples showed the ability to exhibit repeatable and reversible shape change (FIG. 9) and a demonstration of the actuation can be seen in FIG. 4.

Experimental Data—Supplemental and Detailed Synthesis Procedures

Thiol Monomers

FIG. 7 illustrates additional synthesis testing details and effects on conversion percentages for the created LCE samples.

Initial polydomain main-chain LCE samples were synthesized via a thiol-acrylate Michael addition reaction. Two thiol monomers, pentaerythritol tetrakis(3-mercaptopropionate) (PETMP) and 2,2'-(ethylenedioxy)diethanethiol (EDDET), were purchased from Sigma Aldrich (St. Louis, Mo., USA) and used in their as-received condition. These thiol monomers were selected for their use as a tetra-functional crosslinking monomer and di-functional flexible spacer between mesogens. It should be noted that a wide variety of multi-functional thiol monomers are commercially available. Shorter di-thiols were considered, such as 1,2-ethanedithiol, to increase the mesogen density upon synthesis; however, were ultimately not used in this study due to their high volatility, extreme odor, and exposure concerns. Thiol solutions were mixed with functional group ratios ranging from 0:1 to 1:0, with the most studied thiol solutions containing 13 to 14 mol % PETMP functional groups (i.e. 13% of the thiol groups belonged to PETMP).

Diacrylate Mesogen

The diacrylate mesogen, 4-Bis-[4-(3-acryloyloxypropy-propyloxy)benzoyloxy]-2-methylbenzene (RM257), was purchased from Wilshire Technologies (Princeton, N.J., USA) and also used in its as-received condition with no purification. Before being added to the thiol solution, RM257 was dissolved in 31 wt % of toluene at 80° C. to for 5 minutes. Prior studies have directly polymerized RM257 without the need of a solvent,[1] although they have typically done so at an elevated temperature (~100° C.) to melt the mesogen. We chose to dissolve the mesogen in toluene to perform the polymerizations at room temperature and reduce the viscosity of the overall solution for molding purposes. RM257 was then added to the thiol solutions to create a non-stoichiometric acrylate:thiol functional group ratio of 1.15:1 (i.e. an excess of 15% extra acrylate groups existed in all the solutions in this study).

Catalyst and Initiator

Dipropyl amine (DPA) was selected as the Michael-addition catalyst for this system. It also should be noted that a wide variety of catalysts exists and Chan et al. previously published an excellent study on the effects of different catalysts on the reaction rates of thiol-Michael reactions. Preliminary investigations into using DPA showed that the reaction time for the first-stage, Michael-addition reaction could be tailored by controlling the amount of DPA added to the system (FIG. 7). Ultimately, 0.5 mol % of DPA was added to the monomer solutions, which allowed for relatively rapid polymerization but enough time to transfer the solutions into the molds. Lastly, DPA was diluted in toluene at a ratio of 1:100 to provide better control over the amount of DPA added to the solution as well as limit any rapid localized reactions. For example, a drop of pure DPA would cause the monomer solution to immediately gel in the area where added.

The photoinitiator (2-hydroxyethoxy)-2-methylpropiophenone (HHMP) was selected for this system for its stability in the presence of light and at elevated temperatures. A preliminary investigation into the stability of HHMP showed it remained relatively unreacted in the presence of visible light at 75° C. over 30 hours. Ultimately, 0.5 wt % of the total monomer weight was added to the solution and mixed vigorously to ensure a homogenous mixture. Both catalyst and photoinitiator were purchased from Sigma Aldrich and used in their as-received conditions.

FIG. 7 shows conversion vs. time for a representative thiol-acrylate system using an equimolor ratio of EDDET and bisphenol-a-ethoxylate diacrylate using a DPA catalyst and two different photoinitiators at an elevated temperature. FTIR experiments were performed using a Nicolet 6700. The acrylate peak absorbance was measured at 6150 cm$^{-1}$. Spectra measurements were taken with different intervals of time and the peak areas for the acrylate were measured at constant baseline between 6103.6-6201.9 cm$^{-1}$ wavenumber. Acrylate conversion is given by $$\alpha\text{acrylate} = \left(1 - \frac{A_{Initial}}{A_{final}}\right).$$

LCE Formulation

Figure 8:
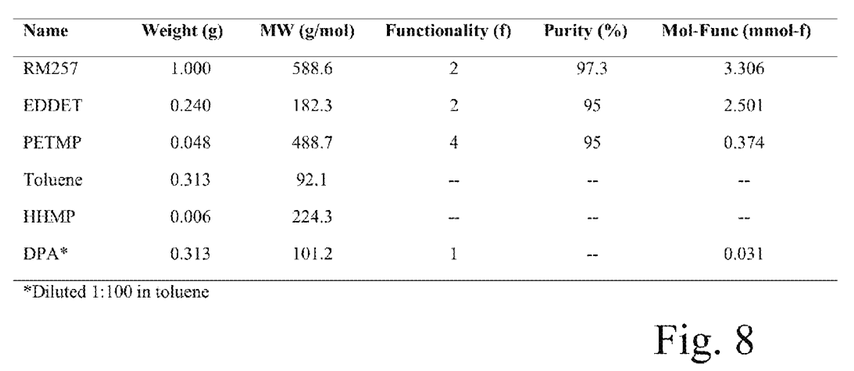
FIG. 8 shows the various weights used to create the most used LCE formulation in this study.

For clarity, the weights and calculations to create the most used LCE formulation in this study are shown in FIG. 8. This system comprises of 13 mol % PETMP crosslinker functional groups and an excess of 15% acrylate functional groups. This formulation was used for data in FIGS. 2 through 4.

Mol-func is defined as the moles of a substance multiplied by its functionality to tailor the system in terms of functional groups present.

Preparation of Samples

After the monomer solution was created and mixed in a glass vial, it was placed in a vacuum chamber to remove any air bubbles caused by the mixing process. This process took less than 1 minute. Afterwards, the solution was poured into either rectangular or dog-bone shaped Teflon molds and allowed to cure overnight. It should be noted that the thiol-acrylate Michael addition reaction is not sensitive to oxygen or mold geometry. As a result, the manufacturing of these samples is highly scalable. This process could be used to create thin films, 2 mm thick dog-bone samples, or cylindrical samples measuring 4 mm in diameter (FIG. 11). Rectangular samples measured approximately 9×60×2 mm$^3$, while dog-bone samples followed ASTM Type V dimensions.

Experimental Details

Mechanical Testing

All mechanical properties of polydomain LCEs samples were tested within 24 hours of synthesis. Dog-bone samples were equilibrated to temperature for 10 minutes before being strained at a rate of 0.1 mm/s. Strain was monitored using an MTS LX-500 laser extensometer (Eden Prairie, Minn., USA). Self-tightening grips were used to secure the samples during testing, as the samples would eventually slip from standard wedge-style grips at high strain levels.

The storage modulus was calculated as a function of UV exposure time using a dynamic mechanical test in a Bose ElectroForce 3200 (Eden Prarie, Minn., USA). Samples were cycled at 1 Hz between 0.2 and 3.5% strain. The phase lag ($\partial$) was determined by curve fitting of the sinusoidal waves using Igor Pro. Storage modulus (E') was calculated as:

$$E' = \frac{\sigma_o}{\varepsilon_o}\cos(\partial) \quad (1)$$

where $\sigma_o$ and $\varepsilon_o$ are the maximum stress and strain values during cyclic loading. The storage modulus was calculated from 2 cycles of test data taken every 15 seconds for 10 minutes of UV exposure time.

FIG. 9 shows graphs of LCE samples strained to different percentages, and thus creating different levels of monodomain alignment, and shown as cycled through strain over time to demonstrate reversible actuation. Dog-bone polydomain LCE samples were strained to 50, 100, 150, 200, 250, and 300% strain to achieve increasing levels of monodomain alignment at room temperature. Permanent monodomain alignment was achieved by initiating the second-stage photo-crosslinking reaction by exposing the stretched samples to UV light for 10 minutes. Once complete, approximately 20 mm portions were cut from the programmed samples' gage lengths and tested for reversible actuation. These newly cut samples were placed in a TA Instruments Q800 (New Castle, Del., USA) under tensile/film geometry. A bias stress of approximately 40 kPa was applied to the sample. This stress was calculated from the cross-sectional area of the sample at room temperature. It is important to note that the true stress level of the material will change as a function of elongation and contraction due to Poisson's effect. Strain was measured as the temperature was ramped between −28 and 121° C. at 5° C. per minute for three cycles. Reversible actuation was seen to be repeatable for all three cycles (FIG. 9).

It is clear that many modifications and variations of this embodiment can be made by one skilled in the art without departing from the spirit of the novel art of this disclosure. While specific parameters, including doping, device configurations, parameters of components, and thresholds may have been disclosed, other reference points can also be used. These modifications and variations do not depart from the broader spirit and scope of the present disclosure, and the examples cited here are illustrative rather than limiting.

What is claimed is:

1. A method comprising:
creating a monomeric solution with a non-stoichiometric ratio of acrylate functional groups to thiol functional groups in the monomeric solution, the non-stoichiometric ratio being greater than 1;
causing a first polymerization of the monomeric solution that is limited by the non-stoichiometric ratio, resulting in a LCE body with a surplus of unreacted acrylate functional groups; and
deforming with a first bias force the LCE body along at least one dimension of the LCE body into a first shape;
wherein the first shape aligns a plurality of polydomains in the LCE body into a temporary monodomain.

2. The method of claim 1, further comprising:
activating reversible shape-memory actuation of the LCE body via exposing the LCE body to a second temperature and a second bias force.

3. The method of claim 1, further comprising:
activating a reversible shape-memory actuation of the LCE body via exposing the LCE body to a second temperature while the LCE body is under a strain.

4. The method of claim 1, wherein a monomer of the monomeric solution is di-functional and includes both acrylate functional groups and thiol functional groups.

5. The method of claim 1, wherein the monomeric solution is a mixture, the method further comprising:
combining into the mixture a mesogenic monomer and a crosslinking agent in order to produces the non-stoichiometric ratio.

6. The method of claim 5, wherein the mixture further includes a flexible linear builder with thiol functional groups on two ends.

7. The method of claim 5, the method further for producing a permanent monodomain in the LCE body and thereby defining a programmed shape of a two-way shape-memory effect, and wherein, the non-stoichiometric ratio is further less than 2:1, the method further comprising:
creating a permanent monodomain in the LCE body from the temporary monodomain by causing a second polymerization of a portion of surplus unreacted acrylate functional groups in a portion of the LCE body, while the portion of the LCE body is in the second shape.

8. The method of claim 7, wherein the two-way shape-memory effect of the liquid crystal elastomer is controlled by a change in temperature in the LCE body.

9. The method of claim 7, wherein the two-way shape-memory effect of the liquid crystal elastomer is controlled by electromagnetic radiation on the LCE body.

10. The method of claim 7, further comprising:
further combining into the mixture a photoinitiator.

11. The method of claim 10, wherein the second polymerization of the portion of surplus unreacted acrylate functional groups is performed by irradiation of the LCE body.

12. The method of claim 7, wherein the second polymerization of the portion of surplus unreacted acrylate functional groups is performed by changing a temperature of the LCE body.

13. The method of claim 7, wherein the second polymerization leaves a remaining portion of surplus acrylate functional groups unreacted in a second portion of the LCE body.

14. The method of claim 7, wherein the second polymerization is confined to a first spatially-limited portion of the LCE body.

15. The method of claim 14, wherein the second polymerization is confined by a photomask controlling irradiation that controls the second polymerization of the LCE body.

16. The method of claim 14, wherein the second polymerization is confined by a temperature gradient that controls the second polymerization of the LCE body.

17. The method of claim 7, further comprising:
third crosslinking a second spatially-limited portion after stretching the different portion of the LCE body to a third shape.

18. The method of claim 17, wherein the third crosslinking completes bonding all remaining unreacted acrylate functional groups in the LCE body.

19. A method comprising:
creating a monomeric solution with a non-stoichiometric ratio of acrylate functional groups to thiol functional groups in the monomeric solution, the non-stoichiometric ratio being greater than 1;
causing a first polymerization of the monomeric solution at a first temperature that is limited by the non-stoichiometric ratio, resulting in a liquid crystal elastomer (LCE) body with a surplus of unreacted acrylate functional groups; and
providing a stimulus to transition a portion of the LCE body to a different molecular domain configuration selected from the group consisting of: isotropic, polydomain, and monodomain.

20. The method of claim 19, wherein the portion of the LCE body is a first portion of the LCE body, the method further comprising:
causing a second polymerization of a portion of surplus unreacted acrylate functional groups in a second portion of the LCE body and thereby producing in the second portion of the LCE body a permanent domain configuration selected from the group consisting of: isotropic, polydomain, and monodomain.

* * * * *